United States Patent
Cima

(10) Patent No.: US 9,678,508 B2
(45) Date of Patent: Jun. 13, 2017

(54) SYSTEMS AND METHODS FOR CONTROLLING POSITIONS AND ORIENTATIONS OF AUTONOMOUS VEHICLES

(75) Inventor: Jarrid Cima, Evansville, IN (US)

(73) Assignee: Flanders Electric Motor Service, Inc., Evansville, IN (US)

( * ) Notice: Subject to any disclaimer, the term of this patent is extended or adjusted under 35 U.S.C. 154(b) by 2052 days.

(21) Appl. No.: 12/619,367

(22) Filed: Nov. 16, 2009

(65) Prior Publication Data

US 2011/0118927 A1   May 19, 2011

(51) Int. Cl.
    G05D 1/00   (2006.01)
    G01C 21/00  (2006.01)
    G05D 1/02   (2006.01)

(52) U.S. Cl.
    CPC ......... G05D 1/0088 (2013.01); G05D 1/0214 (2013.01); *G05D 2201/021* (2013.01)

(58) Field of Classification Search
    None
    See application file for complete search history.

(56) References Cited

U.S. PATENT DOCUMENTS

| | | | | |
|---|---|---|---|---|
| 6,377,889 B1* | 4/2002 | Soest | ................... | A01B 69/008 340/990 |
| 6,377,899 B1* | 4/2002 | Sakai | ................... | G01J 3/06 250/559.1 |
| 6,741,928 B2* | 5/2004 | Millington | ......... | G01C 21/3415 340/988 |
| 6,799,100 B2* | 9/2004 | Burns | ................... | G08G 1/207 340/436 |
| 6,941,220 B2* | 9/2005 | Le | ................... | G01C 21/3655 342/357.31 |
| 6,990,399 B2* | 1/2006 | Hrazdera | ............. | A01B 79/005 348/120 |
| 7,499,776 B2* | 3/2009 | Allard | ................... | G05D 1/0061 701/1 |

(Continued)

FOREIGN PATENT DOCUMENTS

| | | | | |
|---|---|---|---|---|
| AU | 2009904465 | | * 9/2009 | |
| EP | 996047 A1 | * | 4/2000 | ............... G05D 1/02 |

(Continued)

OTHER PUBLICATIONS

Stic search report and search results from Patton dated Nov. 19, 2012.*

(Continued)

*Primary Examiner* — Jean-Paul Cass
(74) *Attorney, Agent, or Firm* — Chetlin IP, P.C.

(57) ABSTRACT

A method for controlling an autonomous vehicle. Data relating to a plurality of proposed vehicle locations is received and a simulated vehicle path based on the received data is generated. A simulated vehicle orientation for at least one point on the simulated vehicle path is determined and presented in a user-discernable form. User verification of the simulated vehicle orientation for at least one point on the simulated vehicle path is received. Approved vehicle control commands from the simulated vehicle path and simulated vehicle orientation are produced such that the approved vehicle control commands control the autonomous vehicle to follow the simulated vehicle path and the simulated vehicle orientation.

34 Claims, 14 Drawing Sheets

(56) References Cited

U.S. PATENT DOCUMENTS

| | | | | |
|---|---|---|---|---|
| 7,502,678 | B2* | 3/2009 | Diekhans | A01B 69/008 172/4.5 |
| 7,991,521 | B2* | 8/2011 | Stewart | G01C 21/00 180/170 |
| 8,068,962 | B2* | 11/2011 | Colvard | E01C 19/006 404/84.05 |
| 8,112,201 | B2* | 2/2012 | Aral | A01B 69/004 701/50 |
| 8,116,977 | B2* | 2/2012 | Aral | A01B 69/004 701/471 |
| 8,437,900 | B2* | 5/2013 | Nishijima | G05D 1/0274 701/23 |
| 8,494,726 | B2* | 7/2013 | Peake | A01B 69/008 701/23 |
| 8,498,806 | B2* | 7/2013 | Fukano | E02F 9/261 701/23 |
| 2001/0021888 | A1* | 9/2001 | Burns | G05D 1/0278 701/23 |
| 2005/0273253 | A1* | 12/2005 | Diekhans | A01B 69/007 701/50 |
| 2005/0284119 | A1* | 12/2005 | Brunnert | A01D 41/127 56/6 |
| 2006/0229811 | A1* | 10/2006 | Herman | G01C 21/3688 701/469 |
| 2007/0192020 | A1* | 8/2007 | Brulle-Drews | G01C 21/3647 701/532 |
| 2008/0082254 | A1* | 4/2008 | Huhtala | G01C 21/00 701/533 |
| 2010/0084147 | A1* | 4/2010 | Aral | A01B 69/004 172/1 |
| 2010/0324772 | A1* | 12/2010 | Aral | A01B 69/004 701/25 |
| 2011/0066313 | A1* | 3/2011 | Larsson | G09B 29/005 701/25 |
| 2011/0108324 | A1* | 5/2011 | Stacy, II | E21B 44/00 175/24 |
| 2011/0112730 | A1* | 5/2011 | Rekow | G05D 1/0219 701/50 |
| 2012/0179322 | A1* | 7/2012 | Hennessy | G05D 1/0278 701/25 |
| 2012/0296529 | A1* | 11/2012 | Peake | A01B 69/008 701/50 |

FOREIGN PATENT DOCUMENTS

| | | | | |
|---|---|---|---|---|
| EP | | 1767741 A2 * | 3/2007 | E21B 7/26 |
| WO | WO 2010149851 A1 * | 12/2010 | | |
| WO | | 2011032208 A1 | 3/2011 | |

OTHER PUBLICATIONS

International Search Report dated Jan. 7, 2011 for PCT Application No. PCT/US2010/055817, 3 pages.

Written Opinion of the International Searching Authority dated Jan. 7, 2011 for PCT Application No. PCT/US2010/055817, 7 pages.

* cited by examiner

SYSTEMS AND METHODS FOR CONTROLLING POSITIONS AND ORIENTATIONS OF AUTONOMOUS VEHICLES

TECHNICAL FIELD

This invention relates to autonomous vehicles in general and more specifically to autonomous vehicle control systems.

BACKGROUND

Numerous kinds of autonomous vehicles are known in the art and are used in a wide variety of applications, from land vehicles, to aerial vehicles, to spacecraft, just to name a few. Autonomous vehicles are designed to perform some or all required functions autonomously, i.e., without contemporaneous user input, and several systems and methods have been developed to allow such vehicles to perform such functions autonomously. However, the systems and methods used to control the autonomous vehicles are highly dependent on the particular type of vehicle as well as on the particular mission that is to be performed. Generally speaking, there is no "one-size fits all" approach to autonomous control system design. That is, systems and methods developed for one type of autonomous vehicle and mission often cannot be used on other types of vehicles or for other missions. Typically, then, new autonomous control systems and methods often must be developed for each new type of autonomous vehicle and mission.

SUMMARY OF THE INVENTION

A method for controlling an autonomous vehicle according to one embodiment of the present invention may involve the steps of: Receiving data relating to a plurality of proposed vehicle locations; generating a simulated vehicle path based on the received data; determining a simulated vehicle orientation for at least one point on the simulated vehicle path; presenting at least the simulated vehicle orientation in a user-discernable form; receiving a user verification of the simulated vehicle orientation for at least one point on the simulated vehicle path; and producing approved vehicle control commands from the simulated vehicle path and simulated vehicle orientation, the approved vehicle control commands controlling the autonomous vehicle to follow the simulated vehicle path and the simulated vehicle orientation.

Also disclosed is a method for producing vehicle control commands for an autonomous vehicle that includes the steps of: Receiving data relating to a plurality of proposed vehicle locations; generating a simulated vehicle path based on the received data relating to the proposed vehicle locations; determining a simulated vehicle orientation at a plurality of points along the simulated vehicle path; presenting the simulated vehicle orientation in a user-discernable form; receiving a user verification of the simulated vehicle orientation for at least one point on the simulated vehicle path; and producing vehicle control commands for the autonomous vehicle from the user-verified simulated vehicle path and simulated vehicle orientation.

The present invention also relates to a system for producing vehicle control commands for an autonomous vehicle that includes an input device, a display device, and a computer system. The computer system receives and stores data from the input device, displays data on the display device, stores program steps for program control, and processes data. The computer system, through the input device, receiving data relating to a plurality of proposed vehicle locations. The computer system processes the received data to generate a simulated vehicle path and to determine a simulated vehicle orientation for at least one point on the simulated vehicle path. The computer system presents at least the simulated vehicle orientation on the display device. In addition, the computer system, through the input device, receives a user verification of the simulated vehicle orientation for at least one point on the simulated vehicle path, and produces vehicle control commands for the autonomous vehicle from the simulated vehicle path and simulated vehicle orientation, the vehicle control commands controlling the autonomous vehicle to follow the simulated vehicle path and the simulated vehicle orientation.

Another method for producing vehicle control commands for an autonomous vehicle includes the steps of: Determining a plurality of proposed vehicle locations; inputting the proposed vehicle locations into a computer; instructing the computer to generate a simulated vehicle path and a simulated vehicle orientation for at least one point on the simulated vehicle path and to present the simulated vehicle orientation in user-discernable form; verifying the simulated vehicle orientation for at least one point on the simulated vehicle path; and instructing the computer to produce vehicle control commands based on the simulated vehicle path and simulated vehicle orientation.

Also disclosed is a computer-readable medium readable by a computer that embodies a program of instructions executable by the computer to cause the computer to produce vehicle control commands for an autonomous vehicle by performing the actions of: Receiving data relating to a plurality of proposed vehicle locations; generating a simulated vehicle path based on the received data relating to the proposed vehicle locations; determining a simulated vehicle orientation for at least one point on the simulated vehicle path; presenting at least the simulated vehicle orientation in a user-discernable form; receiving a user verification of the simulated vehicle orientation for at least one point on the simulated vehicle path; and producing vehicle control commands for the autonomous vehicle from the simulated vehicle path and simulated vehicle orientation.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
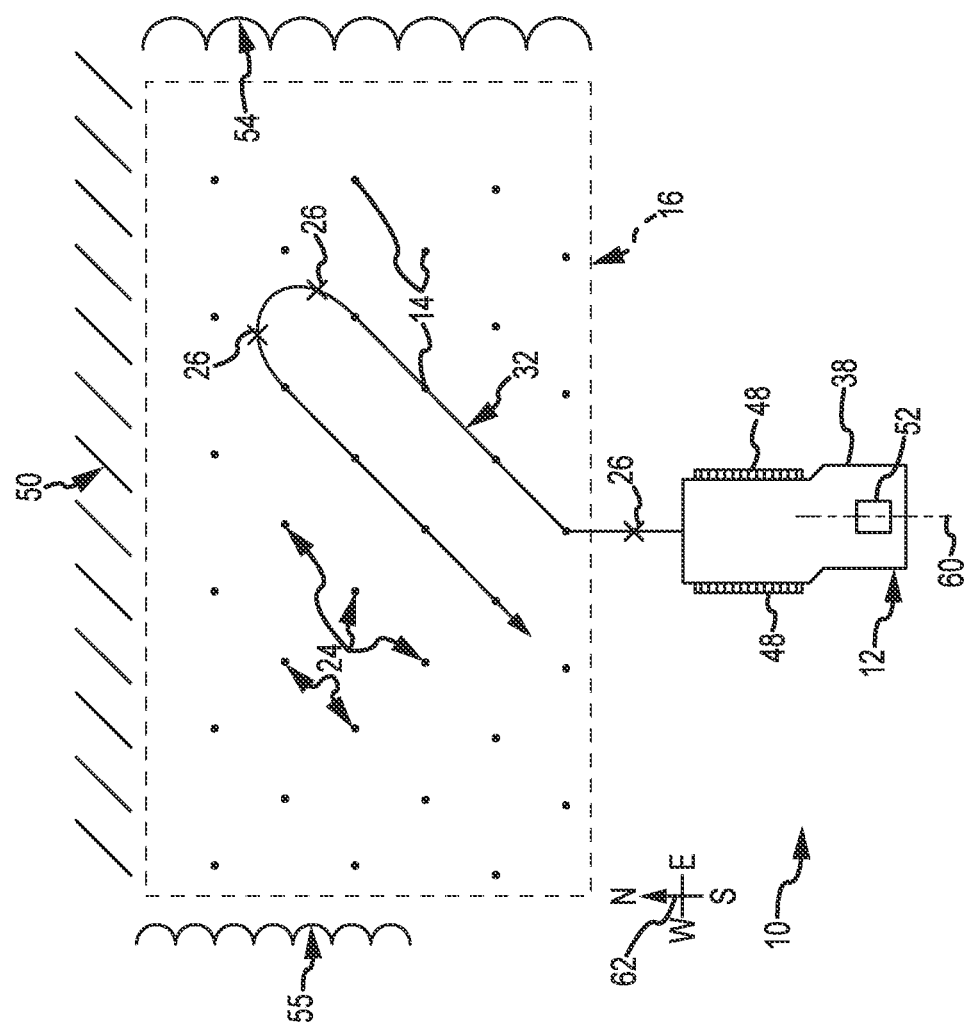
FIG. 1 is a pictorial representation of one embodiment of the present invention as it may be used on an autonomous drill rig to drill boreholes at a plurality of proposed hole locations.

One embodiment of a system 10 for controlling the position and orientation of an autonomous vehicle is shown and described herein as it could be implemented on a blasthole drill rig 12 of the type commonly used in mining and quarrying operations. In such an application, the blasthole drill rig 12 is used to drill or form a large number of blastholes in a drilling field or area 16 in the mine or quarry. The blastholes may then be filled with an explosive that, when detonated, ruptures or fragments the surrounding rock. The fragmented material can be subsequently removed and processed in a manner consistent with the particular operation.

In the particular embodiment shown and described herein, the blasthole drill rig 12 is capable of both autonomous movement and autonomous drilling. That is, the drill rig 12 will move autonomously within the drilling field 16 to each location 14 where a blasthole is to be drilled. Thereafter, the drill rig 12 will autonomously drill or form each blasthole. The present invention relates to the autonomous movement function of blasthole drill rig 12, as opposed to the autonomous hole drilling function.

Figure 2:
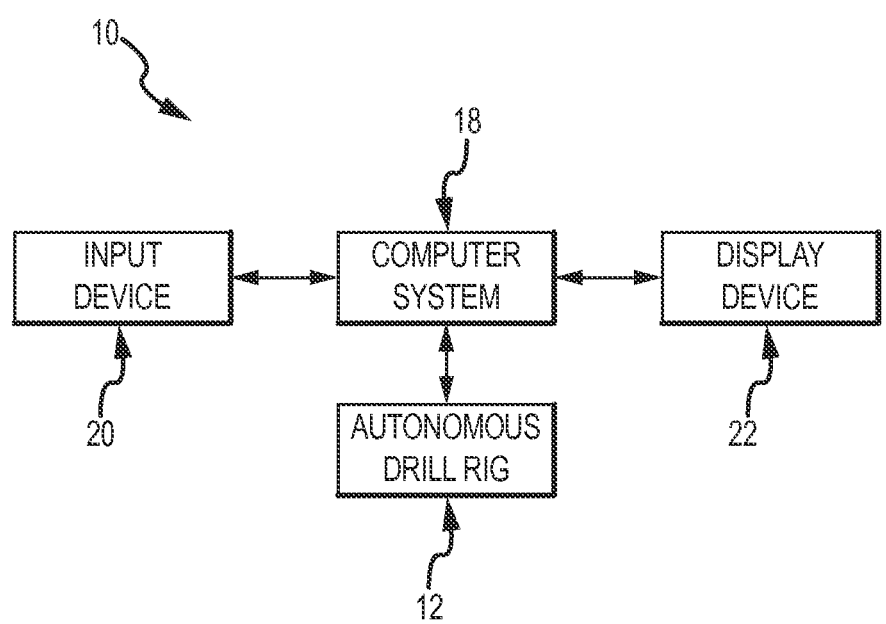
FIG. 2 is a block diagram of one embodiment of a system for controlling the autonomous drill rig illustrated in FIG. 1.

Referring now to FIGS. 1 and 2, one embodiment of the system 10 may comprise a computer system 18, an input device 20, and a display device 22. The input and display devices 20 and 22 may be operatively connected to the computer system 18. The computer system 18 is, in turn, operatively connected to the autonomous drill rig 12. As will be described in greater detail herein, the computer system 18 may be physically located on the autonomous drill rig 12. Alternatively, the computer system 18 or may be provided at some other location, such as an autonomous drill rig command center (not shown).

Input device 20 allows computer system 18 to receive data relating to a plurality of proposed vehicle locations 24, such as one or more proposed hole locations 14 and waypoints 26. Display device 22 is also operatively connected to the computer system 18 and allows the computer system 18 to present various information and data in user-readable or user-discernable form. Computer system 18 processes data relating to proposed hole locations to generate a simulated vehicle path 32 and to determine a simulated vehicle orientation 38 for at least one point on the simulated vehicle path. Computer system 18 presents at least the simulated vehicle orientation 38 on display device for user verification. Once the user has verified the simulated vehicle orientation 38, computer system 18 produces approved vehicle control commands that are then used to control the autonomous drill rig 12.

Figure 3:
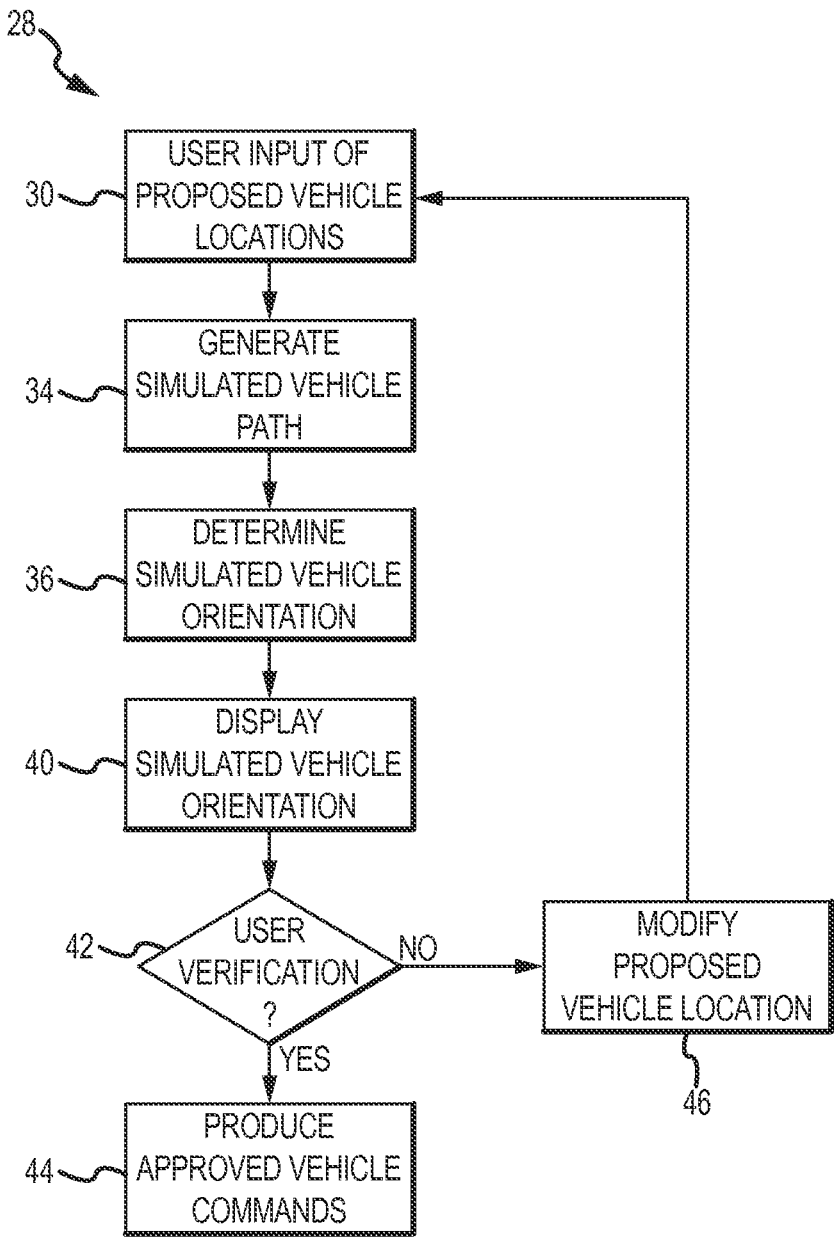
FIG. 3 is a flow chart of one embodiment of a method for producing approved vehicle commands for controlling the autonomous drill rig.

Referring now to FIGS. 1-3, computer system 18 may implement a method 28 for controlling the autonomous vehicle or blasthole drill rig 12. A first step 30 in method 28 involves the input into computer system 18 (e.g., via input device 20) of a plurality of proposed vehicle locations 24 (FIG. 1). In the embodiment shown and described herein, the plurality of proposed vehicle locations 24 may comprise proposed hole locations 14 or waypoints 26. Computer system 18 then uses the input data relating to the plurality of vehicle locations 24 to generate a simulated vehicle path 32, at step 34. Proceeding to step 36, computer system 18 also determines a simulated vehicle orientation 38 for at least one point along the simulated vehicle path 32. As will be described in further detail below, in one embodiment, computer system 18 determines a simulated vehicle orientation 38 at each of the proposed vehicle locations 24, such as, for example, at each proposed hole location 14 and at each waypoint 26. Thereafter, at step 40, computer system 18 presents at least the simulated vehicle orientation 38 in user-discernable form on display device 22. The user may then verify the simulated vehicle orientation 38 at step 42.

If the user finds the simulated vehicle orientation 38 to be acceptable, computer system 18 will then produce approved vehicle commands at step 44. Thereafter, computer system 18 may transmit or otherwise send the approved vehicle control commands to the autonomous drill rig 12. The approved vehicle control commands will then to cause the autonomous drill rig 12 to follow the simulated vehicle path 32 and simulated vehicle orientations 38 as the drill rig 12 moves through the drilling field or area 16.

Alternatively, if the user does not find the simulated vehicle orientation 38 to be acceptable, method 28 will allow the user to modify the user input data at step 46. Briefly, and in one embodiment, the user may modify the data relating to the proposed vehicle locations 24 by supplying one or more additional waypoints 26 to change the simulated vehicle orientation 38 at any desired location along the simulated vehicle path 32. Thereafter, method 28 may be repeated to produce revised simulated vehicle paths 32 and orientations 38 and present them in user-discernable form (e.g., on display device 22). Method 28 may be repeated as necessary until the user is satisfied that the revised simulated vehicle orientation(s) is suitable for the particular application. Once the user verifies the revised simulated vehicle orientation (s), method 28 will, at step 44, produce approved vehicle commands based on the revised simulated vehicle path and revised simulated vehicle orientation.

In the embodiment shown and described herein, the system 10 and method 28 of the present invention are used to generate or produce control commands that control the position and orientation of the autonomous drill rig 12 as it moves about the drilling field or area 16. In this particular application, it is important to ensure that the drill rig 12 avoids certain orientations as it moves throughout the drilling area 16, as certain orientations will be undesirable or even deleterious to the smooth progression of the autonomous drilling operation.

For example, in certain situations, the orientation of the blasthole drill rig 12 may cause the tracks 48 thereof to pass over a hole or holes that have already been drilled. Such an event increases the likelihood that the hole will suffer a partial or complete cave-in, particularly where the geologic structure (e.g., ground) is unstable or contains numerous fractures. In another example, an improper orientation of the autonomous drill rig 12 may cause the drill rig 12 to approach too closely a ledge 50 bordering the drilling area 16. Generally speaking, the soil structure nearby the ledge 50 is substantially weakened and cannot safely support the drill rig 12. Thus, if the tracks 48 of drill rig 12 are too close to the ledge 50, the weakened ledge structure may begin to give way. In an extreme case, the drill rig 12 may slide completely over the ledge 50 as it attempts to position the drill derrick 52 over the proposed hole location 14 or later during the drilling operation. In still another example, improper vehicle orientation may cause the drill rig 12 to contact a "high wall" 54, berm 55, or other structure bordering other regions of the drilling area 16. Contact with a high wall 54 or a berm 55 may damage the drill rig and will almost certainly prevent the drill rig 12 from positioning the drill derrick 52 over the desired or proposed hole location 14.

The system 10 and method 28 of the present invention may be used as follows to control the position and orientation of autonomous drill rig 12 as it moves about within drilling field or area 16. Assuming that a suitable drill hole pattern for the drilling area 16 has been worked out, data relating to the plurality of proposed vehicle locations 24 would be supplied or input to computer system 18, e.g., via input device 20. In this regard it should be noted that in this particular application, many of the proposed vehicle locations 24 will correspond to hole locations 14 at which the blastholes are to be formed. However, the data relating to the plurality of proposed vehicle locations 24 may also comprise one or more waypoints 26. Drill 12 will not drill a blasthole at a waypoint 26. In addition, if the various hole locations 14 are to be drilled in a certain sequence or order, then the data relating to the proposed vehicle locations 24 may also comprise the sequence or order for moving from among the various hole locations 14 and waypoints 26.

Once the user has established the data relating to the proposed vehicle locations 24, the user then inputs these data into the system 10, i.e., at step 30 of method 28. See FIG. 3. Thereafter, the computer system 18 generates a simulated vehicle path 32, at step 34. In the example embodiment shown and described herein, the simulated vehicle path 32 is the path that will be followed by the autonomous drill rig 12 (after having been verified by the user) to move between the various hole locations 14 and waypoints 26. Computer system 18 also determines a simulated vehicle orientation 38 for points on the simulated path 32, at step 36. In the particular embodiment shown and described herein, computer system 18 determines a simulated vehicle orientation 38 for each of the hole locations 14 and waypoints 26 comprising the proposed vehicle locations 24. Computer system 18 then presents the simulated vehicle orientations 38 in a user-discernable form for user verification at step 40.

Referring now primarily to FIGS. 5a-j, the user-discernable form or presentation may comprise a visual representation 56 of the drill rig 12 and drilling area 16. The visual representation 56 may include at least a portion of the proposed vehicle locations 24, as well as a vehicle icon 58. More specifically, and in the particular visual representations 56 depicted in FIGS. 5a-j, the proposed vehicle locations 24 comprise the proposed hole locations 14 (depicted by boxes) as well as waypoints 26 (depicted by triangles). In addition, the order in which the drill rig 12 is to move among the proposed vehicle locations 24 (i.e., the proposed hole locations 14 and waypoints 26) are indicated by numbered boxes. In the particular example illustrated in FIGS. 5a-j, drill rig 12 is to move among thirteen (13) proposed vehicle locations 24 (i.e., positions "1-13"), eight (8) of which are drill hole locations (positions "2-5" and "8-11") and five (5) of which are waypoints 26 (positions "1," "6," "7," "12," and "13").

Figure 5A:
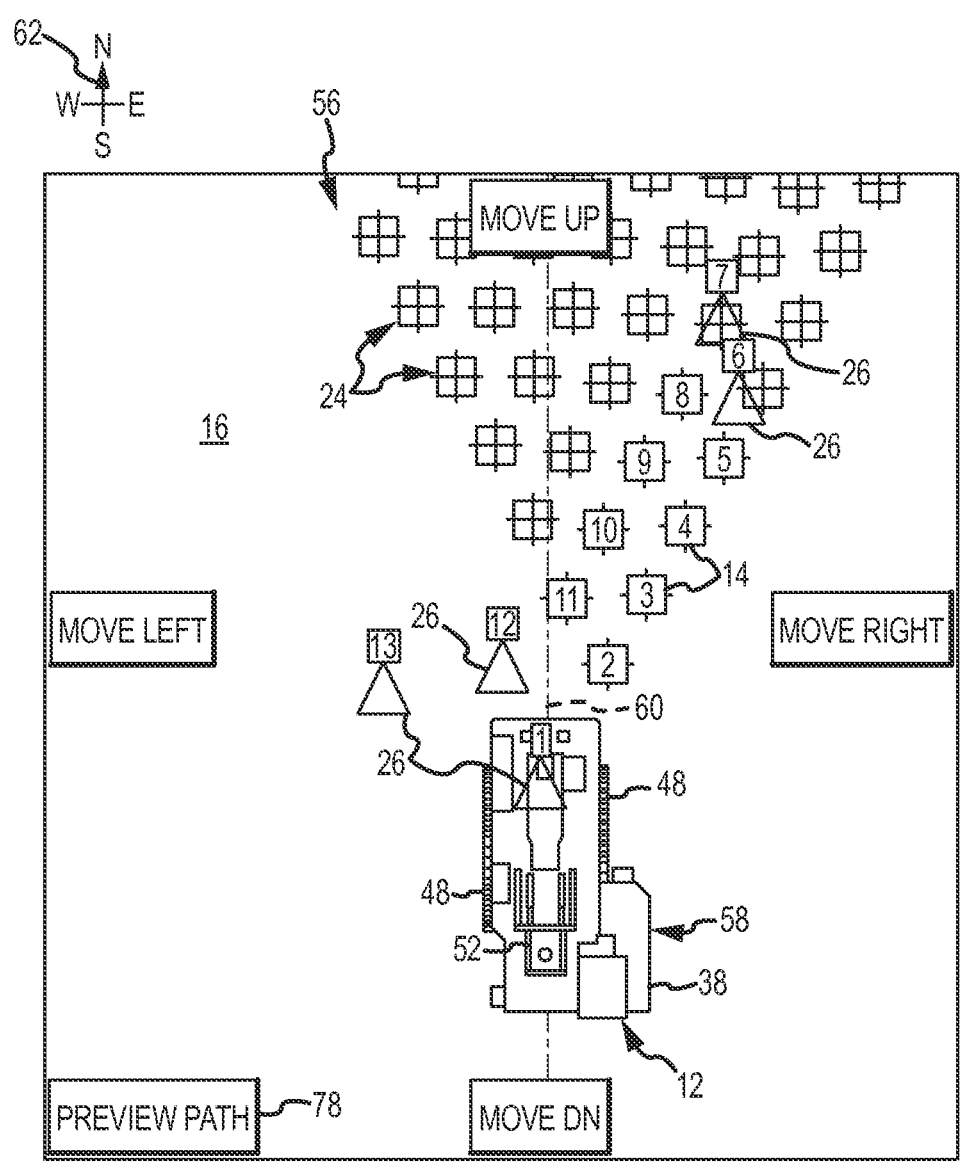
FIGS. 5(*a-j*) are depictions of visual representations that may be displayed to show the position and orientation of the autonomous drill rig at various proposed hole locations and waypoints.

FIG. 5a illustrates an initial condition wherein the drill rig 12 is positioned so that the drill derrick 52 is located some distance away from the first desired vehicle location 24. In this case, the first desired vehicle location is a waypoint 26 and is designated as position "1." The simulated orientation 38 of the drill rig 12 is embodied by the particular orientation of the vehicle icon 58 on visual representation 56. In the depiction illustrated in FIG. 5a, the longitudinal axis 60 of drill rig 12 is substantially vertically oriented, which, for the purposes of this description, may be deemed to coincide with a due north "N" compass orientation 62. The path required to move drill rig 12 so that the drill derrick 52 will be aligned over the first vehicle location 24 (e.g., waypoint 26, or position "1") is aligned with the longitudinal axis 60 of drill rig 12. That is, a due north "N" movement of drill rig 12 will position the drill derrick 52 over the first proposed vehicle location 24 (i.e., position "1").

Figure 5B:
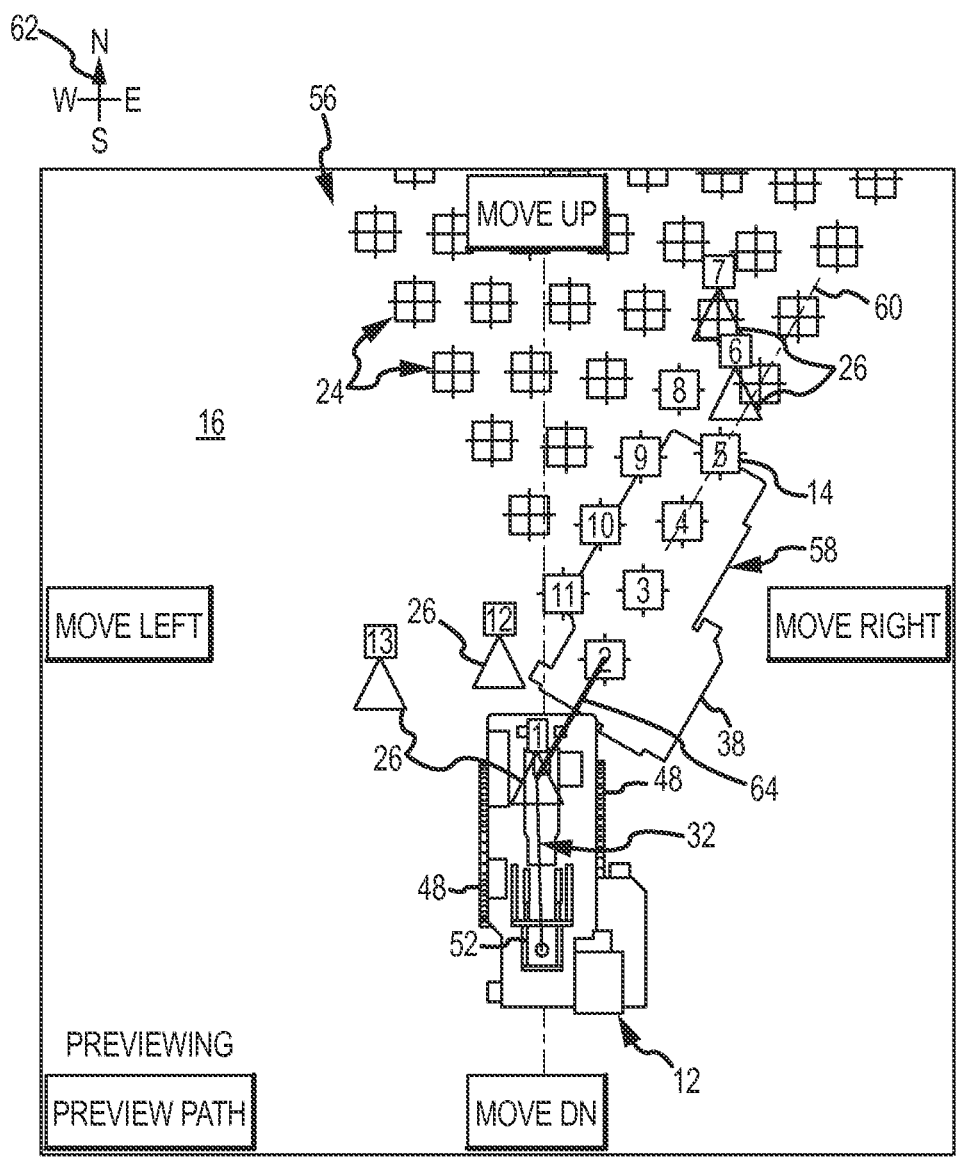

The next proposed vehicle location 24 (i.e., position "2") is a drill location 14. The simulated vehicle path segment 64 required to move the drill rig from position "1" to position "2" is illustrated in FIG. 5b. Moving drill rig 12 along path segment 64 will position the drill derrick 52 over the proposed hole location 14 (i.e., position "2"). The simulated vehicle orientation 38 is embodied in the orientation of drill icon 58 on visual representation 56 and is east "E" of north "N" in this example.

Figure 5C:
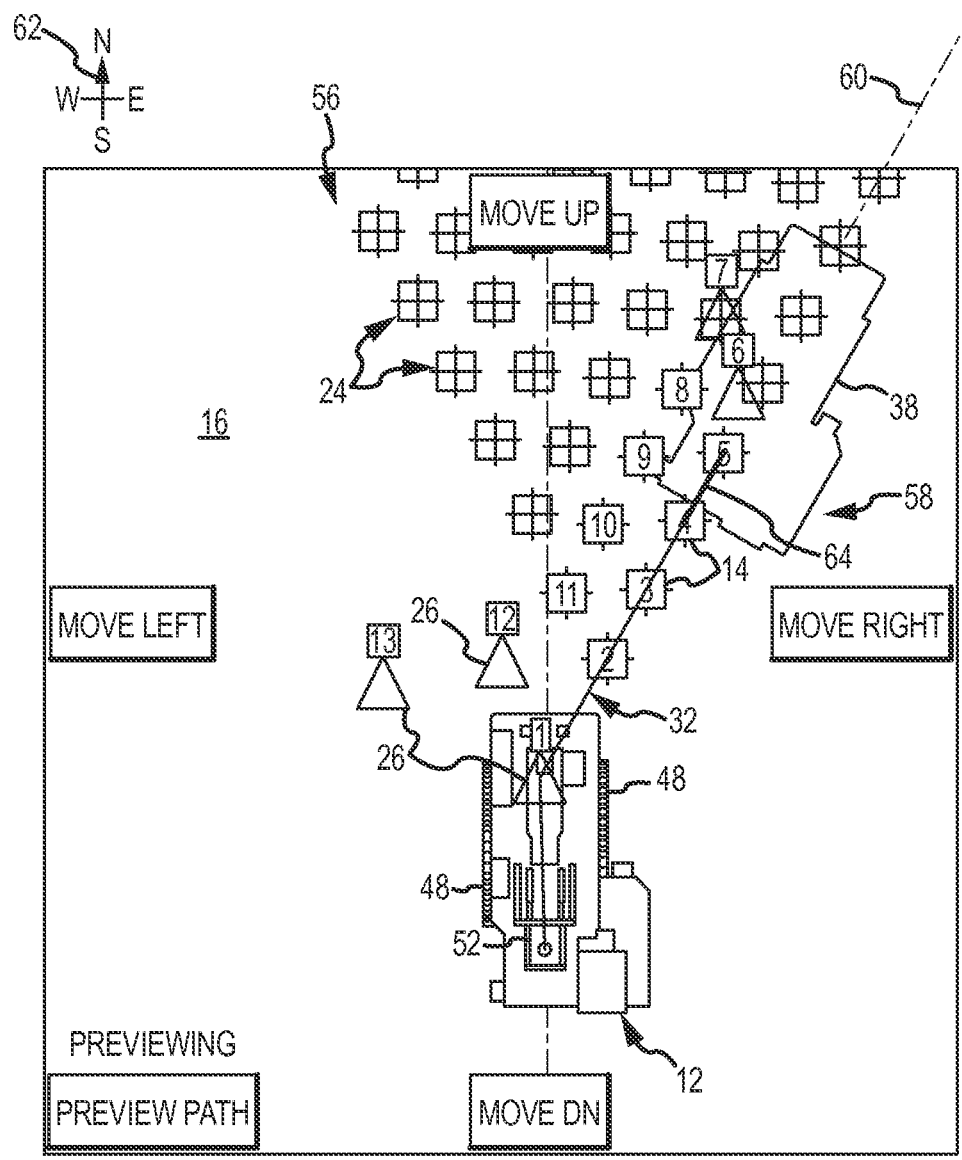
Figure 5D:
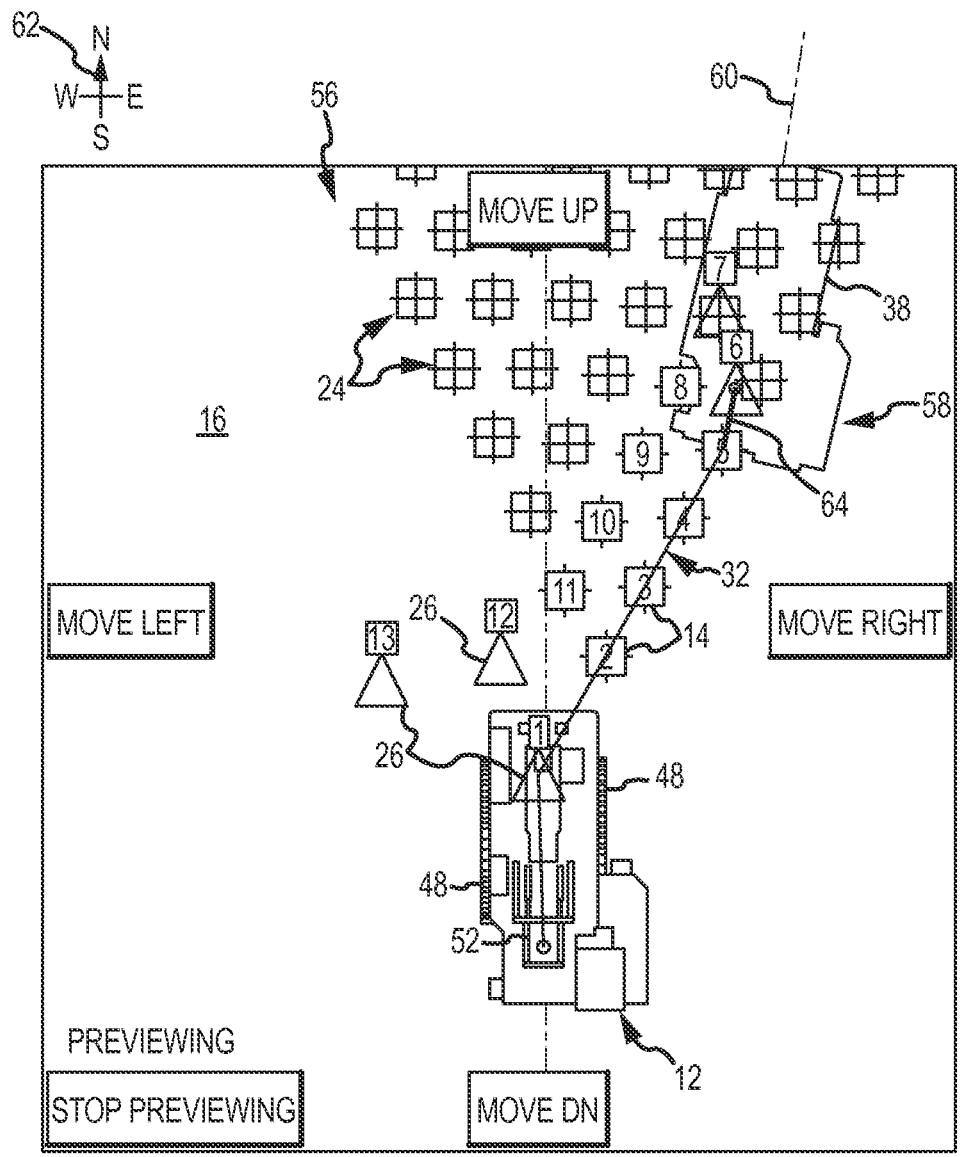

FIG. 5c shows the drill icon 58 at position "5" (positions "3" and "4" are not shown herein for brevity). In this visual representation 56, the drill derrick 52 of drill rig icon 58 is positioned over a drill hole location 14, designated as position "5." The next move will be to position "6", which in this example is a waypoint 26. The move to position "6" is illustrated in FIG. 5d and now shows the drill derrick 52 of drill rig icon 58 positioned over the waypoint 26, which is position "6". Because this proposed vehicle location 24 (i.e., position "6") is a waypoint 26, no hole will be drilled at this location. Rather, the movement of drill rig 12 to this position "6" is performed to change the simulated vehicle orientation 38. More specifically, and as can be seen by comparing FIGS. 5c and 5d, the longitudinal axis 60 of drill rig 12 is now oriented more to the north "N" in FIG. 5d than in FIG. 5c. This orientation change is done to allow the drill rig 12 to be better oriented or positioned in preparation for the move down the adjacent row of proposed drill hole locations 14 (i.e., positions "8-11").

Figure 5E:
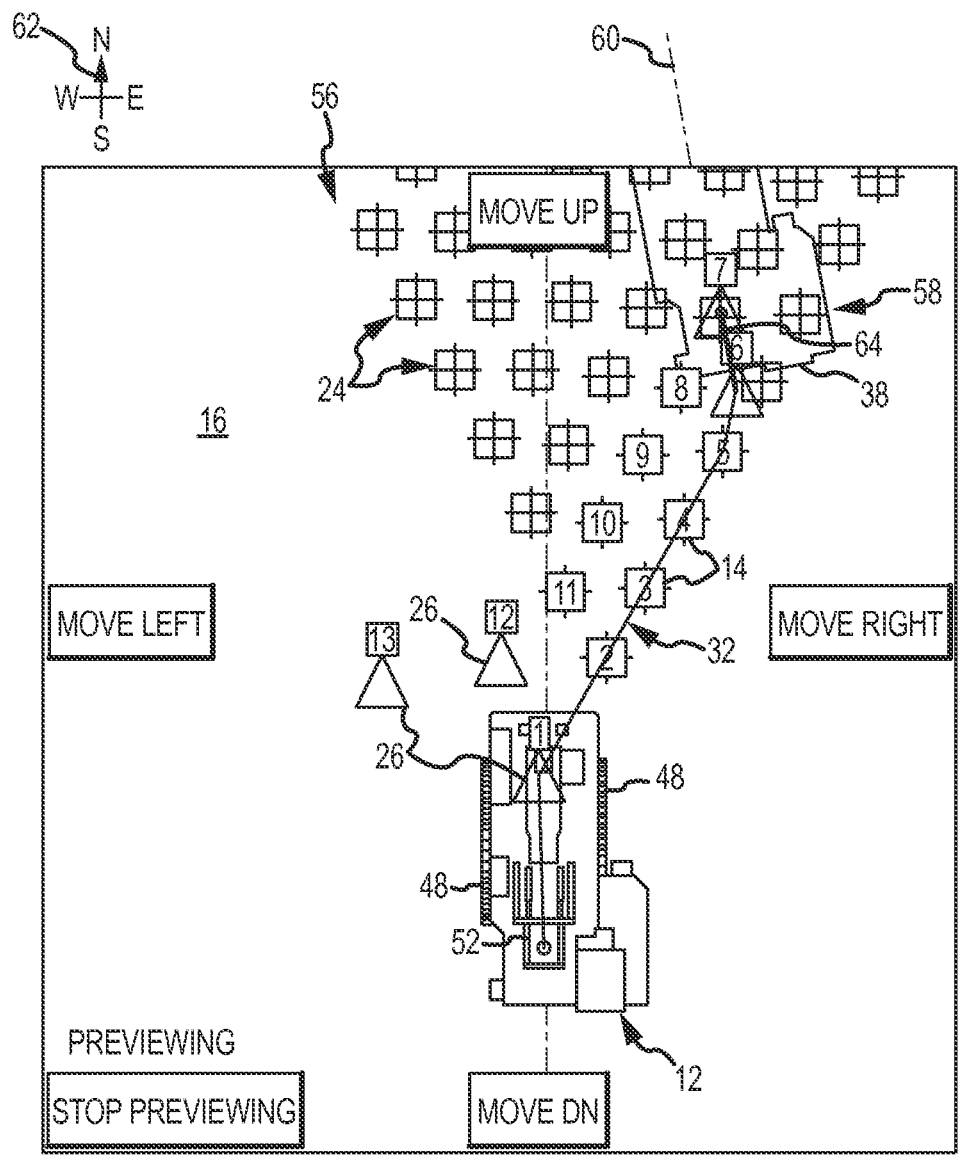

Referring now to FIG. 5e, the drill rig 12 has moved to position "7," which is also a waypoint 26. The movement of the drill rig 12 to this waypoint 26 (i.e., position "7") is performed to further change the simulated vehicle orientation 38 of drill rig 12 in preparation for the move down the adjacent row of proposed drill hole locations (i.e., positions "8-11"). More specifically, the simulated orientation 38 of drill rig 12 now shows the longitudinal axis 60 inclined to a position slightly west "W" of north "N." Thereafter, the drill rig icon 58 is shown moving down the adjacent row of proposed drill hole locations 14, (i.e., positions 8-11) in FIGS. 5f-h. Note that drill rig 12 moves down the adjacent row in the opposite or reverse direction.

Figure 5F:
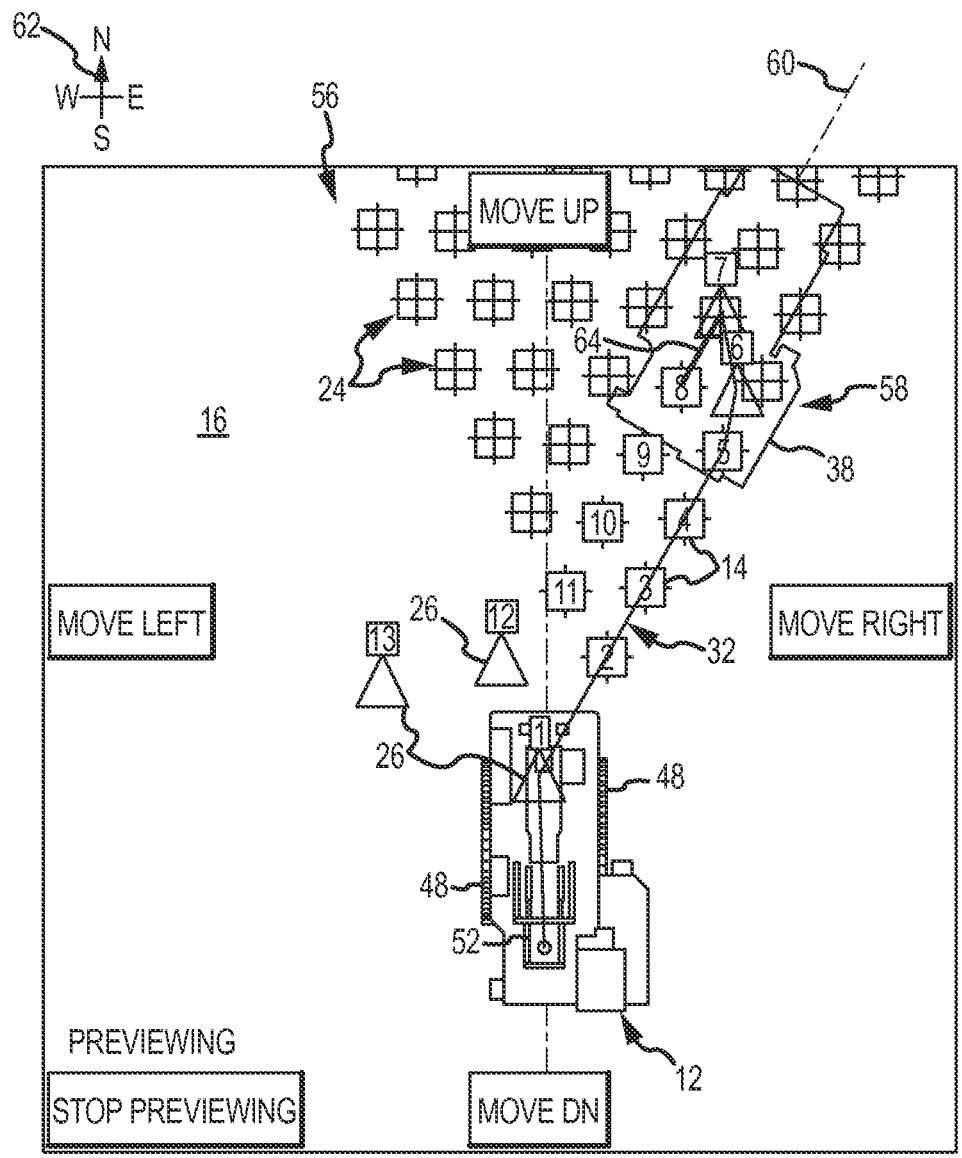
Figure 5G:
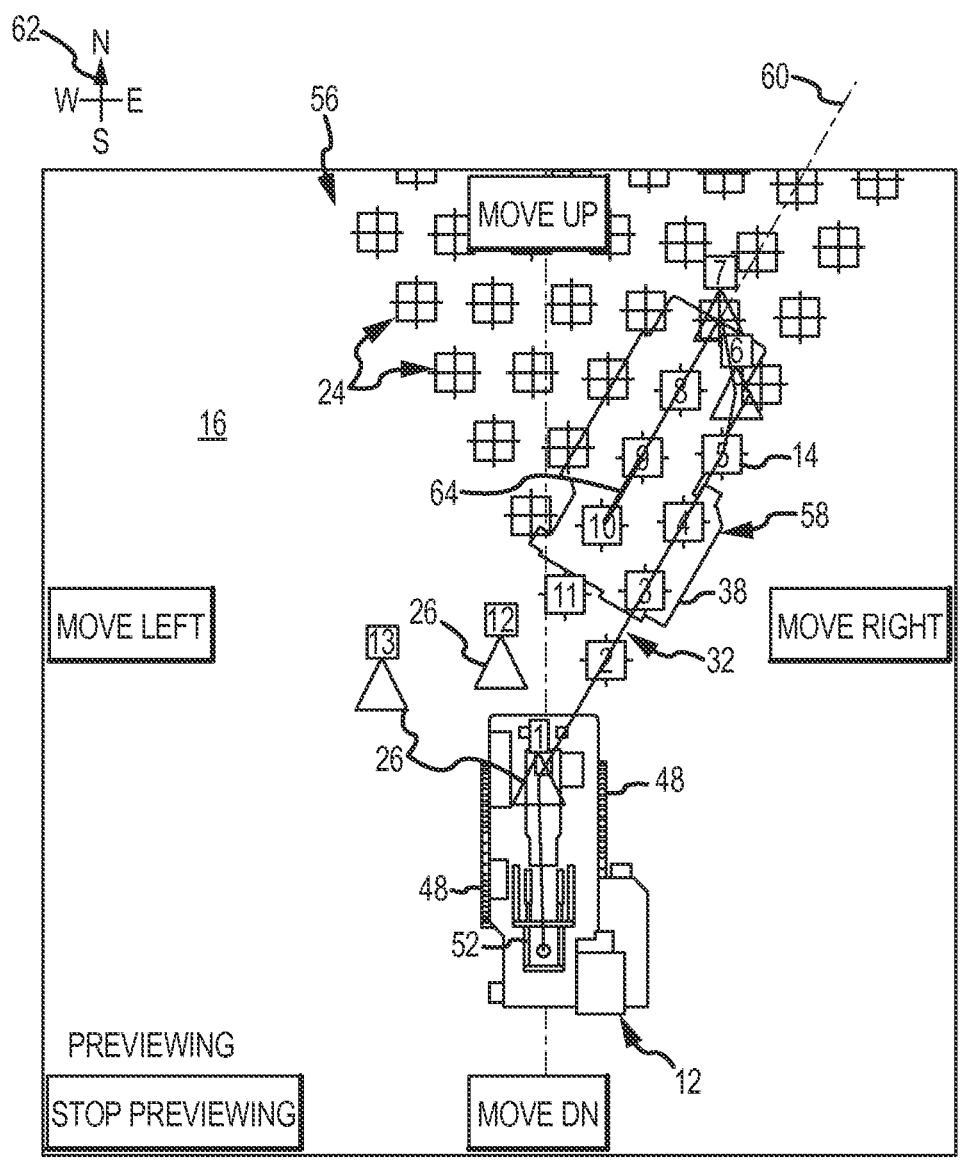
Figure 5H:
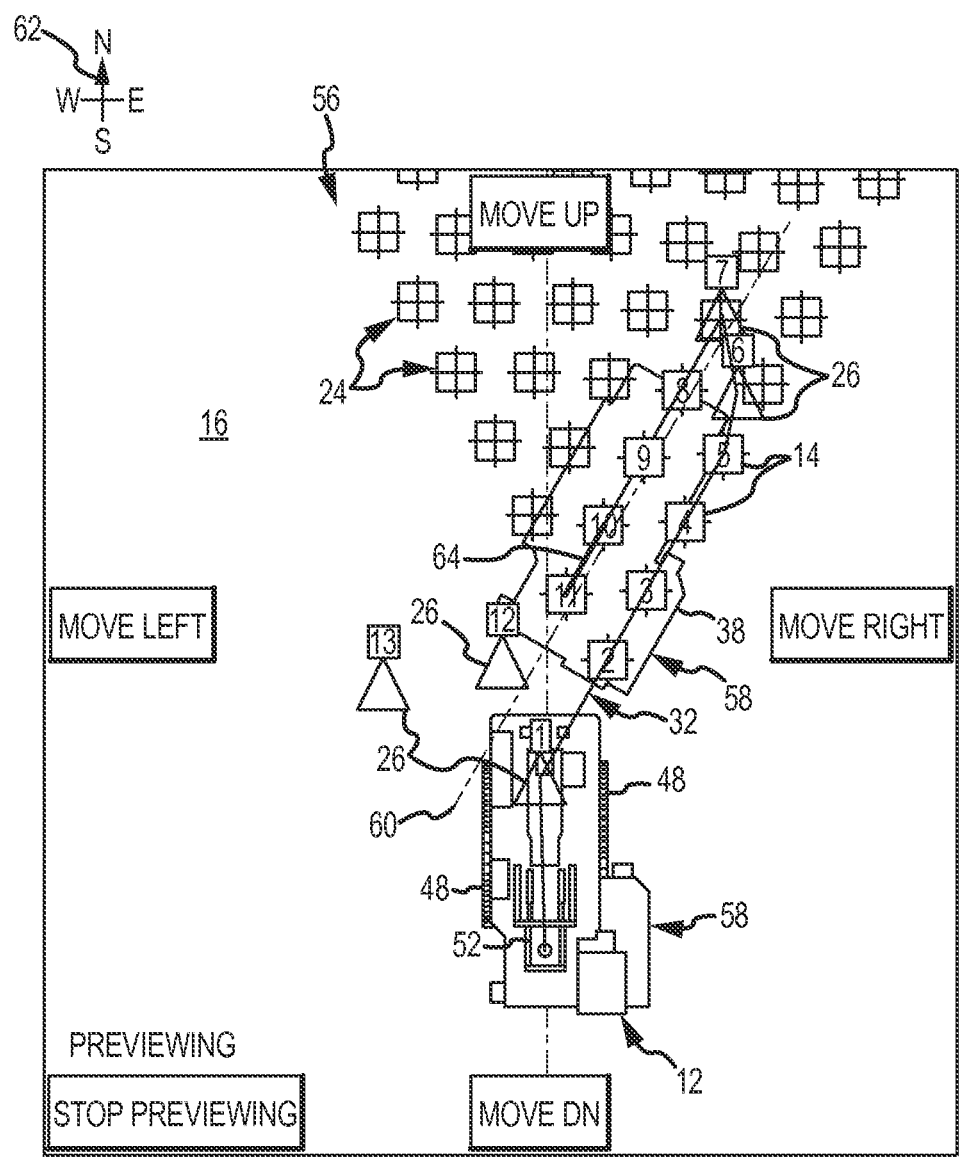
Figure 5I:
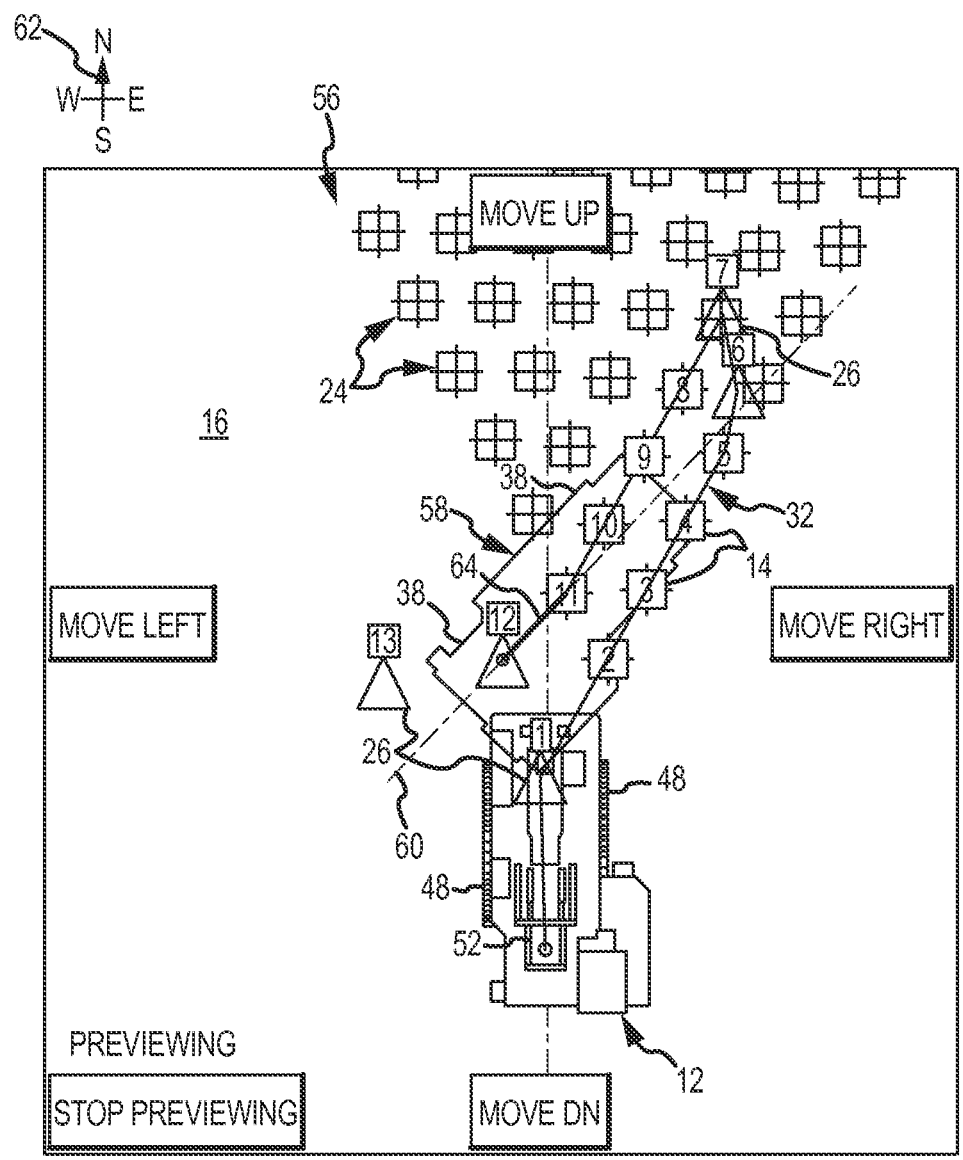
Figure 5J:
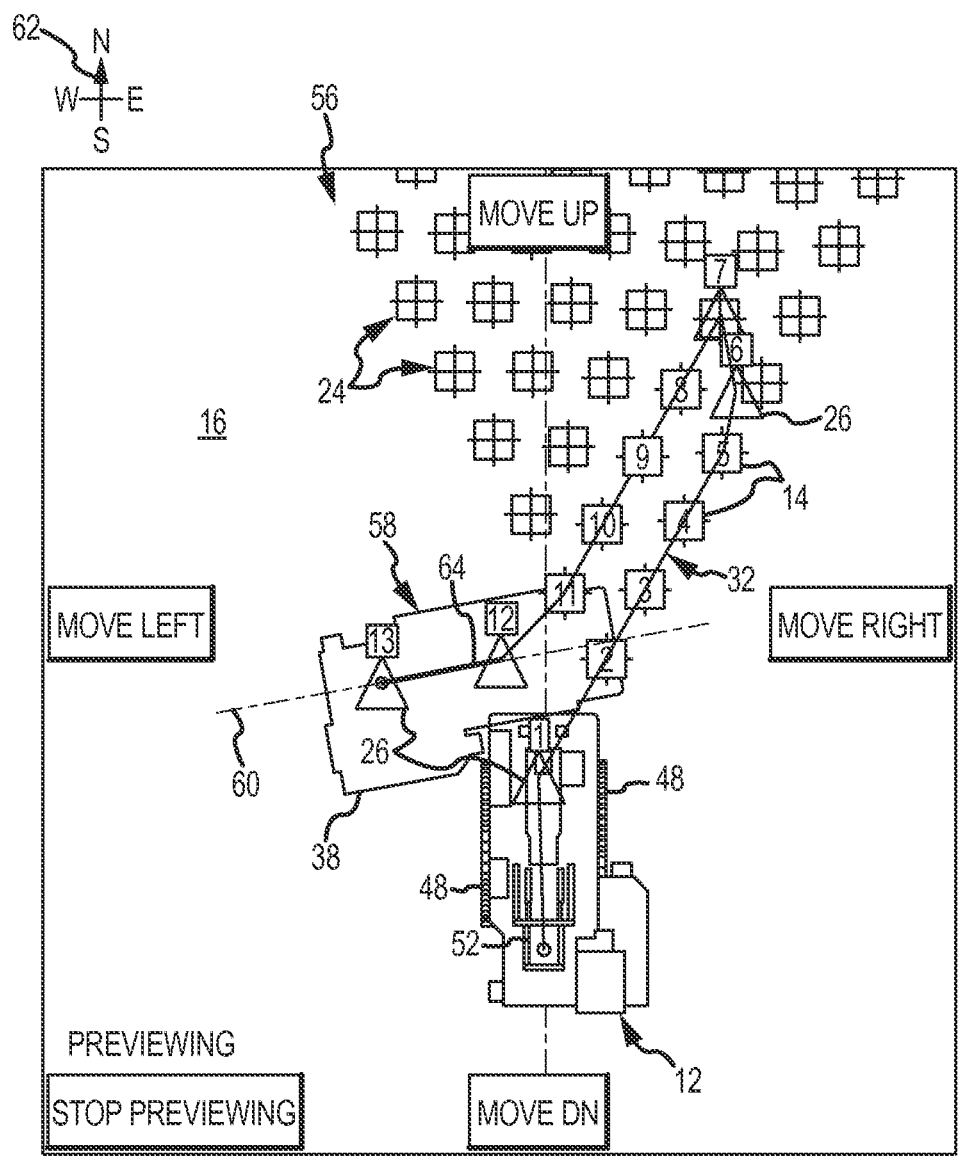

Referring now to FIGS. 5i and 5j, the last two positions "12" and "13" are waypoints 26 and are used to change the simulated orientation 38 of drill rig 12 to prepare it to proceed down the next adjacent row of drill hole locations 14. As illustrated in FIG. 5j, the simulated orientation 38 of drill rig 12 is such that the longitudinal axis 60 of drill rig 12 is south "S" of west "W." As will be described in further detail below, in one embodiment, the various visual representations 56 (e.g., depicted in FIGS. 5a-j), may be animated by sequentially displaying the simulated vehicle orientations 38 at various ones of the plurality of proposed vehicle locations.

Regardless of whether the various visual representations 56 are animated, the user (not shown) verifies the various simulated orientations 38 before the system 10 will produce approved vehicle commands. If the user determines that any of the simulated orientations are not suitable or may create other problems, the user may change the simulated vehicle orientation(s) 38 by modifying the data relating to the proposed vehicle locations 24. In the example embodiment shown and described herein, the user may modify the data by providing one or more additional waypoints 26 at appropriate locations or positions within the field 16. The user may then instruct the system 10 to re-run method 28 to produce revised simulated vehicle paths and orientations and present them via new visual representations 56. This process may be repeated as necessary until the user is satisfied that the revised simulated vehicle orientations 38 are suitable for the particular autonomous drilling sequence. Once the user verifies the revised simulated vehicle orientation, method 28 will produce approved vehicle commands based on the revised simulated vehicle path and revised simulated vehicle orientation at step 44. Thereafter, the approved vehicle control commands will be used to control the autonomous drill rig 12 to follow the simulated vehicle path 32 to achieve the simulated vehicle orientations 38.

A significant advantage of the present invention is that it may be used to readily determine whether the autonomous vehicle will move to an undesirable position or achieve an undesirable orientation. When applied to an autonomous drill rig 12, the present invention can be used to advantage to plan the autonomous movement of the drill rig 12 to avoid moving over holes that have already been drilled, thereby eliminating the possibility of hole cave-in due to the drill tracks 48 passing over drilled blastholes. The present invention may also be used to advantage to avoid ledges 50, high walls 54, or other features or obstructions that may border the drilling area 16. Thus, once the autonomous mission has been fully planned and verified, it may be subsequently conducted with a high degree of confidence that the drill 12 will not move to an undesired location or orientation.

Having briefly described the system and method of the present invention, as well as some of its more significant features and advantages, various exemplary embodiments of the invention will now be described in detail. However, before proceeding with the description, it should be noted that the various embodiments of the present invention are shown and described herein as they could be implemented on a blasthole drill rig 12 of the type commonly used in mining and quarrying operations to drill boreholes suitable for blasting.

However, it should be understood that the present invention may also be used in other applications besides mining and quarrying operations. Indeed, the present invention could be used in any application wherein it would be desirable to plan an autonomous mission to avoid undesired vehicle positions or orientations. Consequently, the present invention should not be regarded as limited to the particular devices, systems, and applications shown and described herein.

Referring back now to FIGS. 1 and 2, one embodiment of a system 10 for controlling the position and orientation of an autonomous vehicle is shown and described herein as it could be implemented on a blasthole drill 12 of the type commonly used in mining and quarrying operations, as already described. Blasthole drill rig 12 may be mounted on a pair of crawler tracks 48 that allow the drill rig 12 to be moved or "trammed" from place-to-place. Drill rig 12 may also be provided with a drill derrick 52 for supporting a drill string (not shown) suitable for drilling or forming the blastholes.

Drill rig 12 may also be provided with various other components and systems, such as one or more power plants, electrical systems, hydraulic systems, pneumatic systems, etc. (not shown), that may be required or desired for the operation of the drill rig 12. However, because such other components and systems that may comprise drill rig 12 are well-known in the art, and because a detailed description of such other systems and components is not required to understand or practice the systems and methods of the present invention, the various other components and systems of drill rig 12 that are not directly related to the systems and methods of the present invention will not be described in further detail herein.

In addition, drill rig 12 may also be provided with one or more autonomous control systems to allow the drill rig 12 to move autonomously within the drilling field 16 as well as to allow the drill rig 12 to drill or form the various blastholes in an autonomous manner. As mentioned above, because the present invention relates to the autonomous movement function of the blast hole drill rig 12, as opposed to the autonomous hole drilling function, only those aspects of the autonomous control system for moving the drill rig 12 that are required to understand and appreciate the context of the present invention will be described herein.

Referring now to FIG. 2, the system 10 may comprise a computer system 18, an input device 20, and a display device 22. The input and display devices 20 and 22 are operatively connected to the computer system 18. The computer system 18 is also operatively associated with the autonomous drill rig 12, so that approved vehicle control commands generated by computer system 18 may be used to control the autonomous drill rig 12. More specifically, and in the particular embodiment shown and described herein, the computer 18 may interface with a suitable autonomous control system (not shown) provided on the drill rig 12. Then, after receiving the approved vehicle control commands generated by computer system 18, the autonomous control system may implement the approved vehicle control commands to control the movement of the autonomous drill rig 12.

Computer system 18 may comprise any of a wide range of computer systems that are now known in the art or that may be developed in the future that are or would be suitable for performing the various functions and operations described herein. Consequently, the present invention should not be regarded as limited to any particular type of computer system. However, by way of example, in one embodiment, computer system 18 comprises a general purpose programmable computer, such as the ubiquitous "PC." The computer system 18 may be physically located at any convenient position. For example, in one embodiment, the computer system 18 may be physically located on the drill rig 12. Alternatively, the computer system 18 may be provided at some other location, such as an autonomous vehicle command center (not shown).

Regardless of the location of the computer system 18, it should be operatively associated with the autonomous drill rig so that the approved vehicle control commands can be communicated to the drill rig 12. Such communication could be, for example, via the wireless transfer of data files, if the computer is not physically connected to the autonomous control system on the drill rig 12. Alternatively, the computer system 18 may be directly connected to the autonomous control system of drill rig 12, in which case the data files could be transferred via a wired or optical connection. In still another variation, the computer system 18 could comprise a portion of the autonomous control system on the drill rig 12, in which case no separate connection or communication link would be required. Still other arrangements and system architectures are possible, as would become apparent to persons having ordinary skill in the art after having become familiar with the teachings provided herein. Consequently, the present invention should not be regarded as limited to any particular system architecture for implementing the approved vehicle control commands in the autonomous operation of the drill rig 12.

Regardless of the particular system architecture that may be utilized, input device 20 is operatively connected to the computer system 18 so that data from the input device 20 can be transferred or input into the computer system 18. In this regard it should be noted that input device 20 could comprise more than one device or system, as may be required or desired in any particular embodiment. For example, in one embodiment wherein computer system 18 comprises a general purpose programmable computer, the input device 20 may comprise a keyboard and a pointer system (e.g., a "mouse"). In addition, input device 20 could also comprise a data file or any other device or system suitable for providing the required input data into computer system 18.

Display device 22 is also operatively connected to the computer system 18 and allows the computer system 18 to display data and information in a user-discernable form. In one embodiment, display device comprises a color liquid crystal display (LCD), although other devices are known and could also be used. Finally, because input devices and display devices suitable for use with the present invention are well-known in the art and could be readily provided by persons having ordinary skill in the art, the particular input and display devices 20 and 22 that may be utilized with the present invention will not be described in further detail herein.

As already briefly described, computer system 18 may be programmed to implement the various functions and methods described herein. Such functions and methods may be implemented via any of a wide variety of programming systems and languages that are now known in the art or that may be developed in the future that are suitable for controlling the operations of such computer systems. However, because such programming systems and languages are well-known in the art and could be easily used by persons having ordinary skill in the art to program the computer system 18 to operate in accordance with the teachings provided herein, the particular programming systems and languages that may be utilized in one embodiment of the present invention will not be described in further detail herein.

With reference now primarily to FIG. 3, the computer system 18 may be programmed to implement a method 28 for controlling the autonomous vehicle or drill rig 12. In one embodiment, the method 28 results in the production of approved vehicle control commands that thereafter may be used by the autonomous control system (not shown) associated with drill rig 12 to control the movement of drill rig 12. Alternatively, in another embodiment, method 28 could involve additional steps or processes that would result in the direct control of the drill rig 12, as would become apparent to persons having ordinary skill in the art after having become familiar with the teachings provided herein.

A first step 30 of method 28 involves the input into computer system 18 (e.g., via input device 20) of a plurality of proposed vehicle locations 24 (FIG. 1). In the embodiment shown and described herein, the plurality of proposed vehicle locations 24 comprise proposed hole locations 14 and waypoints 26. A proposed hole location 14 is where the drill rig 12 is to drill a blasthole, whereas a waypoint 26 is merely a position or location where the drill rig 12 is to move, typically to change the orientation of the drill rig 12, although it could be for other purposes. Computer system 18 processes the input data relating to the plurality of vehicle locations 24 and generates a simulated vehicle path 32 at step 34.

Figure 4:
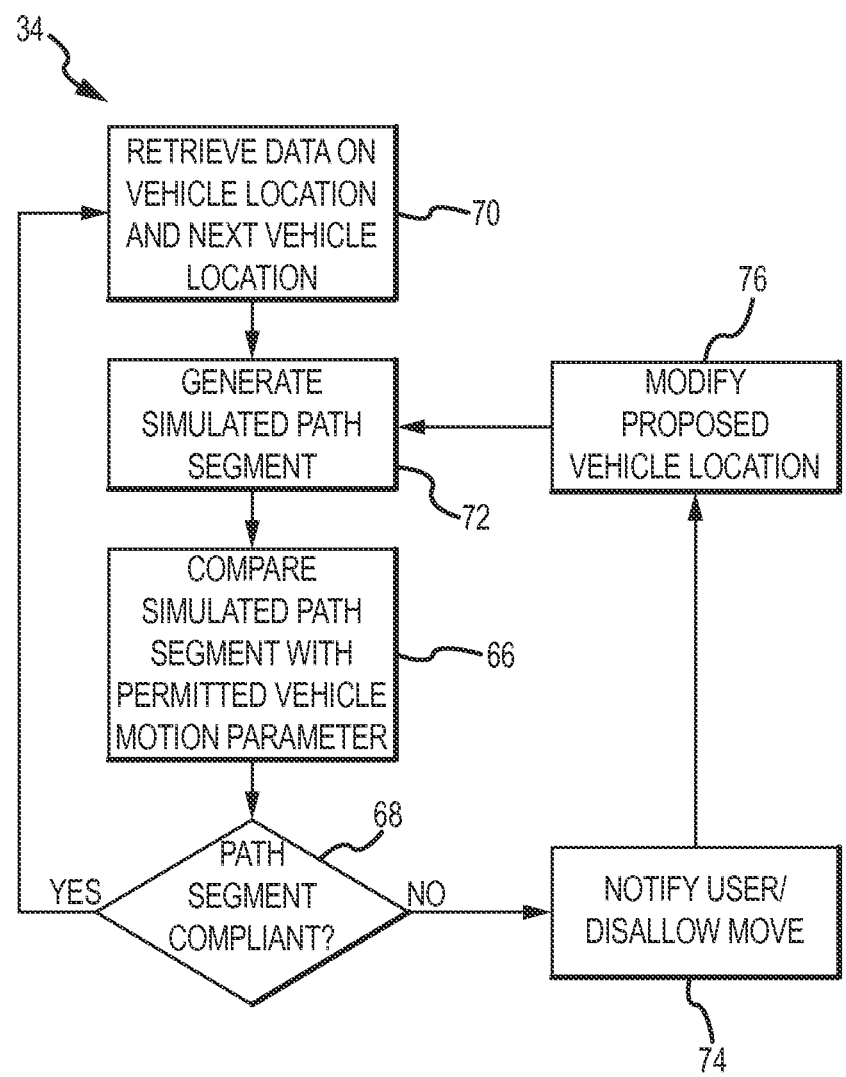
FIG. 4 is a flow chart of one embodiment of a method for generating a simulated vehicle path.

In one embodiment, the simulated vehicle path 32 actually comprises a plurality of simulated vehicle path segments 64 (shown in FIGS. 5*a-j*). Each simulated vehicle path segment 64 represents that path required to move between two desired vehicle locations 24. Referring now to FIG. 4, one embodiment of step 34 may involve a step 66 of comparing the simulated vehicle path segment 64 with a permitted vehicle motion parameter. If the simulated vehicle path segment 64 is compliant with the permitted vehicle motion parameter, as determined at step 68, the process 34 retrieves the next proposed vehicle location 24, i.e., at step 70, and generates the next simulated vehicle path segment 64 at step 72. Computer system 18 then repeats steps 66 and 68 to determine whether the next simulated path segment 64 is compliant with the permitted vehicle motion parameter.

If the simulated path segment 64 does not comply with the permitted vehicle motion parameter, as determined by step 68, then the computer system notifies the user at step 74. Optionally, the system 18 may disallow the proposed vehicle location. The computer system 18 may then permit the user to modify the proposed vehicle location at step 76. The foregoing process is repeated until simulated path segments 64 have been generated for all of the proposed vehicle locations 24.

In the particular embodiment shown and described herein, the permitted vehicle motion parameter represents a maximum heading change (or degree of turn) that is advisable for any particular simulated vehicle path segment 64. For example, tracked vehicles, such as drill rig 12, are often limited in their ability to conduct a large heading change in a short distance. The heading change limitation may be imposed by the vehicle manufacturer to reduce the stress on the vehicle track system. Alternatively, a vehicle operator may desire to impose a permitted vehicle motion parameter due to operational considerations, such as vehicle maintenance issues or other reasons. For example, depending on soil conditions, it may be advisable to limit the maximum heading change associated with any particular simulated vehicle path segment 64 to prevent the vehicle tracks 48 from "bogging down" or otherwise becoming stuck in the soil. Consequently, process 34 provides additional assurance that the subsequent autonomous operation of the vehicle will be carried out as planned and without incident.

Referring back now to FIG. 3, in the next step 36 of method 28, computer system 18 determines a simulated vehicle orientation 38 for at least one point along the simulated vehicle path 32. In one embodiment, computer system 18 determines a simulated vehicle orientation 38 at each of the proposed vehicle locations 24, such as, for example, at each proposed hole location 14 and at each waypoint 26. In one embodiment, computer system 18 determines the simulated vehicle orientation 38 based on the angle or orientation of the simulated vehicle path segment 64. That is, the simulated vehicle orientation 38 is the same as the orientation of the vehicle path segment 64. Alternatively, other methods may be used to determine the simulated vehicle orientation 38. For example, in another embodiment, the simulated vehicle orientation 38 may be determined with the aid of a vehicle kinematic model that models the heading change of the vehicle in response to a known steering input.

Regardless of the particular method that is used to determine the simulated vehicle orientation 38, the computer system 18 will thereafter present at least the simulated vehicle orientation 38 in user-discernable form on display device 22. See step 40. The user may then verify the simulated vehicle orientation 38, at step 42.

If the user finds the simulated vehicle orientation 38 to be acceptable, computer system 18 will then produce approved vehicle commands at step 44. Thereafter, computer system 18 may transmit or otherwise send the approved vehicle control commands to the autonomous drill rig 12, as described above. The approved vehicle control commands will then cause the autonomous drill rig 12 to follow the simulated vehicle path 32 and simulated vehicle orientations 38 as the drill rig 12 moves through the drilling field or area 16.

If the user does not find the simulated vehicle orientation 38 to be acceptable (i.e., at step 42), method 28 allows the user to modify the user input data at step 46. In the particular embodiment shown and described herein, the user may modify the data relating to the proposed vehicle locations 24 by supplying one or more additional waypoints 26 to change the simulated vehicle orientation 38 at any desired location along the simulated vehicle path 32. After the additional waypoint or waypoints 26 are added, method 28 may be repeated to produce revised simulated vehicle paths and orientations and present them in user-discernable form (e.g., on display device 22). This modification process may be repeated as necessary until the user is satisfied that the revised simulated vehicle orientation is suitable for the particular application. Once the user verifies the revised simulated vehicle orientation, method 28 will, at step 44, produce approved vehicle commands based on the revised simulated vehicle path and revised simulated vehicle orientation.

The present invention may be operated as follows to control the position and orientation of autonomous drill rig 12 as it moves about within drilling field or area 16. Once a suitable drill hole pattern for the drilling area 16 has been established, data relating to the plurality of proposed vehicle locations 24 is supplied or input to computer system 18, e.g., via input device 20, at step 30. As noted above, in the particular embodiment shown and described herein, many of the proposed vehicle locations 24 will correspond to hole locations 14 at which the blastholes are to be drilled. However, the data relating to the plurality of proposed vehicle locations 24 may also comprise one or more waypoints 26. See FIG. 1. Drill 12 will not drill a blasthole at a waypoint 26. In addition, if the various hole locations 14 are to be drilled in a certain sequence or order, then the data relating to the proposed vehicle locations 24 may also comprise the sequence or order for moving among the various hole locations 14 and waypoints 26. Alternatively, the system 10 may be configured to establish the sequence or order from moving between the various proposed vehicle locations 24.

After the data relating to the proposed vehicle locations 24 has been input at step 30, the computer system 18 generates a simulated vehicle path 32, at step 34. In the example embodiment shown and described herein, the simulated vehicle path 32 comprises a plurality of simulated vehicle path segments 64 (FIGS. 5a-j) that connect each pair of proposed vehicle locations 24, e.g., proposed hole locations 14 or waypoints 26, as the case may be. Each simulated vehicle path segment 64 defines the path that will be followed by the autonomous drill rig 12 between two locations 24. Taken altogether, then, the simulated vehicle path segments 64 define the simulated vehicle path 32, i.e., the path that will be followed by the autonomous drill rig 12 to move between all of the various hole locations 14 and waypoints 26. See also FIG. 1.

Next, at step 36, computer system 18 determines a simulated vehicle orientation 38 for points on the simulated path 32. In the particular embodiment shown and described herein, computer system 18 determines a simulated vehicle orientation 38 for each simulated vehicle path segment 64. Thus, the simulated vehicle orientation 38 will be known for each of the hole locations 14 and waypoints 26 comprising the proposed vehicle locations 24. Computer system 18 then presents the simulated vehicle orientations 38 in a user-discernable form for user verification at step 40.

Referring now to FIGS. 5a-j, the user-discernable form or presentation used by computer system 18 may comprise a visual representation 56 of the drill rig 12 and drilling area 16. The various visual representations 56 may be presented on display device 22. In one embodiment, the process of displaying the various visual representations 56 may be initiated by activating an appropriate icon on the initial visual representation 56, such as the "Preview Path" icon 78 illustrated in FIG. 5a.

The visual representation 56 may include at least a portion of the proposed vehicle locations 24, as well as a vehicle icon 56. More specifically, the proposed vehicle locations 24 comprise the proposed hole locations 14, as well as waypoints 26. In the particular visual representation 56 illustrated in FIGS. 5a-j, the proposed hole locations 14 are represented by boxes, whereas the various waypoints 26 are represented by triangles. In addition, the order in which the drill rig 12 is to move among the proposed vehicle locations 24 (i.e., the proposed hole locations 14 and waypoints 26) are indicated by numbered boxes. In this exemplary illustration, then, drill rig 12 is to move between thirteen (13) proposed vehicle locations 24 (i.e., positions "1-13"). Eight (8) of the proposed vehicle locations 24 (i.e., positions "2-5" and "8-11") correspond to drill hole locations 14, whereas the remaining five (5) proposed vehicle locations 24 (i.e., positions "1," "6," "7," "12," and "13") correspond to waypoints 26.

FIG. 5a displays an initial condition wherein the drill rig 12 is positioned so that the drill derrick 52 is located some distance away from the first desired vehicle location 24. In this example, the first desired vehicle location is a waypoint 26 and is designated as position "1." The simulated orientation 38 of the drill rig 12 is embodied by the particular orientation of the vehicle icon 58 on visual representation 56. As illustrated in FIG. 5a, the longitudinal axis 60 of drill rig icon 58 is substantially vertically oriented and coincides with a due north "N" compass orientation 62. Accordingly, no heading change of the drill rig 12 will be required for this first move. That is, a due north "N" movement of drill rig 12 along simulated vehicle path segment 64 will position the drill derrick 52 over the first proposed vehicle location 24 (i.e., position "1"). The user may view subsequent positions and orientations of the drill rig 12 by activating the "Preview Path" icon 78 provided on the visual representation 56.

Referring now to FIG. 5b, the next proposed vehicle location 24 (i.e., position "2") is a drill location 14. The simulated vehicle path segment 64 required to move the drill rig from position "1" to position "2" is illustrated in FIG. 5b. Moving drill rig 12 along simulated vehicle path segment 64 will position the drill derrick 52 over the proposed hole location 14 (i.e., position "2"). The simulated orientation 36 is embodied in the orientation of drill icon 58 on visual representation 56 and is such that the longitudinal axis 60 is east "E" of north "N" in this example.

FIG. 5c shows the drill icon 58 at position "5" (positions "3" and "4" are not shown herein). In this visual representation 56, the drill derrick 52 of drill rig icon 58 is positioned over a drill hole location 14 (i.e., position "5"). The next move will be to position "6", which in this example is a waypoint 26. The move to position "6" is illustrated in FIG. 5d and now shows the drill derrick 52 of drill rig icon 58 positioned over the waypoint 26 (i.e., position "6"). Because this proposed vehicle location 24 is a waypoint 26, no hole will be drilled at this location. Rather, the movement of drill rig to this position "6" is performed so as to change the simulated vehicle orientation 38. More specifically, and as can be seen by comparing FIGS. 5*c* and 5*d*, the longitudinal axis 60 of drill rig 12 is now oriented more to the north "N" in FIG. 5*d* than in FIG. 5*c*. This orientation change is done to allow the drill rig 12 to be better oriented or positioned in preparation for the move down the adjacent row of proposed drill hole locations 14 (i.e., positions "8-11").

Referring now to FIG. 5*e*, the drill rig 12 has moved to position "7," which is also a waypoint 26. The movement of the drill rig 12 to this waypoint 26 (i.e., position "7") is performed to further change the orientation of drill rig 12 in preparation for the move down the adjacent row of proposed drill hole locations (i.e., positions "8-11"). More specifically, the simulated orientation 38 of drill rig 12 now shows the longitudinal axis 60 inclined to a position west "W" of north "N."

FIGS. 5*f*-5*h* show the drill rig icon 58 moving down the adjacent row of proposed drill hole locations 14, (i.e., positions "8-11"). Note that drill rig 12 moves down the adjacent row of proposed drill hole locations 14 in the opposite or reverse direction. Because the proposed hole locations 14 corresponding to positions "8-11" are substantially aligned, no significant heading changes are required for drill rig 12. Drill rig 12 simply proceeds down the row of drill hole locations 14. Note also that because the drilling sequence and vehicle orientation were well-planned, the tracks 48 of drill rig 12 will not travel over the holes drilled at positions "2-5," i.e., as the drill rig 12 drills holes at positions "8-11."

Referring now to FIGS. 5*i* and 5*j*, the last two positions "12" and "13" are waypoints 26. The user has placed waypoints 26 at the particular locations to change the simulated orientation 38 of drill rig 12 to prepare it to proceed down the next adjacent row of drill hole locations 14. As illustrated in FIG. 5*j*, the simulated orientation 38 of drill rig 12 is such that the longitudinal axis 60 of drill rig 12 is slightly south "S" of west "W." Drill rig 12 will now be properly oriented to drill the first hole in the next row.

FIGS. 5*a*-*j* represent successive visual representations 56 or "screen shots" of the simulated vehicle orientations 38 at various points along the simulated vehicle path 32. In one embodiment, a single visual representation 56 may be presented for each individual vehicle location 24. Each such visual representation 56 may be manually selected by the user. The user may manually approve the vehicle orientation in each visual representation 56 until the user verifies that all of the simulated vehicle orientations 38 are satisfactory. Optionally, the computer system 18 may be programmed to animate the various visual representations 56 (e.g., depicted in FIGS. 5*a*-*j*), by sequentially displaying the simulated vehicle orientations 38 at various ones of the plurality of proposed vehicle locations 14. This animation could also depict the position of the drill rig 12 at various intermediate positions between adjacent vehicle locations 14 to provide a smooth animation.

Regardless of whether the various visual representations 56 are animated, the user verifies the various simulated orientations 38 before the system 10 will produce approved vehicle commands. If the user determines that any of the simulated vehicle orientations 38 are not suitable or may create other problems, the user may change the simulated vehicle orientation(s) 38 by modifying the data relating to the proposed vehicle locations 24.

In the example embodiment shown and described herein, the user may modify the data by providing one or more additional waypoints 26 at appropriate locations or positions within the field 16. The user may then instruct the system 10 to re-run method 28 to produce revised simulated vehicle paths and orientations and present them via new visual representations 56. This process may be repeated as necessary until the user is satisfied that the revised simulated vehicle orientations 38 are suitable for the particular autonomous drilling sequence.

Once the user verifies the revised simulated vehicle orientation, method 28 will produce approved vehicle commands based on the revised simulated vehicle path and revised simulated vehicle orientation at step 44. Thereafter, the approved vehicle control commands will be used to control the autonomous drill rig to follow the simulated vehicle path 32 to achieve the simulated vehicle orientations 38.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A method for controlling an autonomous vehicle, comprising:
   receiving data relating to a plurality of proposed vehicle locations;
   generating a simulated vehicle path based on the received data, the simulated vehicle path comprising a simulated path segment between a first proposed vehicle location and a second proposed vehicle location;
   determining a simulated vehicle orientation for the autonomous vehicle for at least one point on the simulated vehicle path;
   displaying a visual representation of at least the simulated vehicle orientation in a user-discernable form;
   receiving a user verification of the simulated vehicle orientation for at least one point on the simulated vehicle path resulting in a user-verified simulated vehicle orientation and a user-verified simulated path; and
   producing approved vehicle control commands from the user-verified simulated vehicle path and the user-verified simulated vehicle orientation, the approved vehicle control commands controlling the autonomous vehicle to follow the user-verified simulated vehicle path and achieve the user-verified simulated vehicle orientation.

2. The method of claim 1, further comprising determining a simulated vehicle orientation for at least the first and second vehicle location points on the simulated vehicle path.

3. The method of claim 1, wherein displaying a visual representation of at least the simulated vehicle orientation in user-discernable form comprises:
   displaying at least a portion of the plurality of proposed vehicle locations; and
   displaying a vehicle icon in the simulated vehicle orientation with respect to the displayed proposed vehicle locations.

4. The method of claim 3, further comprising animating said displaying by sequentially displaying the simulated vehicle orientation at various ones of the plurality of proposed vehicle locations.

5. The method of claim 4, further comprising displaying the simulated vehicle path.

6. The method of claim 5, further comprising animating said displaying by sequentially displaying the simulated vehicle orientation at sequential points along the simulated vehicle path.

7. The method of claim 1, wherein receiving data relating to a plurality of proposed vehicle locations comprises receiving data for a proposed hole location and a waypoint.

8. The method of claim 1, wherein data relating to a plurality of proposed vehicle locations further comprises sequence data relating to a sequence for moving between the plurality of proposed vehicle locations.

9. The method of claim 1, further comprising receiving a user modification of the data relating to a plurality of proposed vehicle locations before said producing approved vehicle commands.

10. The method of claim 9, wherein receiving a user modification of data relating to a plurality of proposed vehicle locations comprises receiving one or more additional waypoints.

11. The method of claim 1, further comprising:
comparing the simulated vehicle path with a maximum heading change for the autonomous vehicle; and
notifying the user if the simulated vehicle path violates the maximum heading change.

12. The method of claim 11, further comprising disallowing a proposed vehicle location that would result in a violation of the maximum heading change.

13. The method of claim 1, further comprising using the approved vehicle control commands to produce a vehicle control data file, the vehicle control data file being used by the autonomous vehicle to control the path and vehicle orientation of the autonomous vehicle.

14. A method for producing vehicle control commands for an autonomous vehicle, comprising:
receiving data relating to a plurality of proposed vehicle locations;
generating a simulated vehicle path based on the received data relating to the proposed vehicle locations;
determining a simulated vehicle orientation in relation to an axis of the autonomous vehicle at a plurality of points along the simulated vehicle path;
presenting the simulated vehicle orientation in a user-discernable form;
receiving a user verification of the simulated vehicle orientation for at least one point on the simulated vehicle path; and
producing vehicle control commands for the autonomous vehicle from the user-verified simulated vehicle path and simulated vehicle orientation.

15. The method of claim 14, further comprising applying the produced vehicle control commands to the autonomous vehicle to cause the autonomous vehicle to follow the user-verified simulated vehicle path and achieve the simulated vehicle orientation.

16. The method of claim 14, wherein presenting the simulated vehicle orientation in user-discernable form comprises:
displaying at least a portion of the plurality of proposed vehicle locations; and
displaying a vehicle icon in the simulated vehicle orientation with respect to the displayed proposed vehicle locations.

17. The method of claim 16, further comprising animating said displaying by sequentially displaying the simulated vehicle orientation at various ones of the plurality of proposed vehicle locations.

18. The method of claim 16, further comprising displaying the simulated vehicle path.

19. The method of claim 18, further comprising animating said displaying by sequentially displaying the simulated vehicle orientation at sequential points along the simulated vehicle path.

20. A system for producing vehicle control commands for an autonomous vehicle, comprising:
an input device;
a display device; and
a computer system operatively associated with said input device and said display device, said computer system receiving and storing data from said input device, displaying data on said display device, storing program steps for program control, and processing data;
said computer system, through said input device, receiving data relating to a plurality of proposed vehicle locations, said computer system processing the received data relating to the proposed vehicle locations to generate a simulated vehicle path and to determine a simulated vehicle orientation in relation to an axis of the autonomous vehicle for at least one point on the simulated vehicle path, said computer system presenting at least the simulated vehicle orientation on said display device;
said computer system, through the input device, receiving a user verification of the simulated vehicle orientation for at least one point on the simulated vehicle path; and
said computer system producing vehicle control commands for the autonomous vehicle from the simulated vehicle path and simulated vehicle orientation, said vehicle control commands controlling the autonomous vehicle to follow the simulated vehicle path and achieve the simulated vehicle orientation.

21. A computer-readable medium readable by a computer, said computer-readable medium embodying a program of instructions executable by the computer to cause the computer to produce vehicle control commands for an autonomous vehicle by performing the actions of:
receiving data relating to a plurality of proposed vehicle locations;
generating a simulated vehicle path based on the received data relating to the proposed vehicle locations;
determining a simulated vehicle orientation for the autonomous vehicle for at least one point on the simulated vehicle path;
displaying at least the simulated vehicle orientation in a user-discernable form;
receiving a user verification of the simulated vehicle orientation for at least one point on the simulated vehicle path; and
producing vehicle control commands for the autonomous vehicle from the simulated vehicle path and simulated vehicle orientation.

22. A method for producing vehicle control commands for an autonomous vehicle, comprising:
determining a plurality of proposed vehicle locations;
inputting the proposed vehicle locations into a computer;
instructing the computer to generate a simulated vehicle path based on the plurality of proposed vehicle locations and a simulated vehicle orientation for at least one point on the simulated vehicle path and to display the simulated vehicle orientation in user-discernable form, the simulated vehicle orientation being with reference to an axis of the autonomous vehicle;
verifying the simulated vehicle orientation for at least one point on the simulated vehicle path; and instructing the computer to produce vehicle control commands based on the simulated vehicle path and simulated vehicle orientation.

23. The method of claim 22, further comprising, editing, on the computer, the proposed vehicle locations to change the simulated vehicle orientation along the simulated vehicle path.

24. The method of claim 23, further comprising, after said editing:
instructing the computer to generate a revised simulated vehicle path and a revised simulated vehicle orientation for at least one point on the revised simulated vehicle path and display the revised simulated vehicle orientation in user-discernable form;
verifying the revised simulated vehicle orientation for at least one point on the revised simulated vehicle path; and
instructing the computer to produce vehicle control commands based on the revised simulated vehicle path and revised simulated vehicle orientation.

25. The method of claim 22, wherein inputting the proposed vehicle locations into the computer comprises inputting data of a proposed hole location and a waypoint.

26. The method of claim 25, further comprising, editing, on the computer, the proposed vehicle locations to change the simulated vehicle orientation along the simulated vehicle path.

27. The method of claim 26, wherein said editing comprises inputting at least one waypoint to change the simulated vehicle orientation at a point along the simulated vehicle path.

28. The method of claim 22, wherein said instructing the computer to produce vehicle control commands is automatically performed after said verifying without further user input.

29. The method of claim 22, wherein the simulated vehicle path comprises a plurality of simulated vehicle path segments.

30. The method of claim 29, wherein instructing the computer to generate a simulated vehicle path based on the plurality of proposed vehicle locations comprises comparing at least one simulated vehicle path segment with a permitted vehicle motion parameter.

31. The method of claim 29, wherein the simulated vehicle orientation is based on an orientation of at least one simulated vehicle path segment.

32. A method for controlling an autonomous vehicle, comprising:
receiving data relating to a plurality of proposed vehicle locations;
generating a simulated vehicle path based on the received data, the simulated vehicle path comprising simulated vehicle path segments;
comparing at least one simulated vehicle path segment with a permitted vehicle motion parameter;
notifying the user if the at least one simulated vehicle path segment is not compliant with the permitted vehicle motion parameter; and
disallowing the proposed vehicle location;
generating a revised proposed vehicle location; and
generating a revised simulated path segment;
determining a simulated vehicle orientation for multiple proposed vehicle locations, the simulated vehicle orientation being in relation to an axis of the autonomous vehicle;
sequentially displaying the simulated vehicle orientation at multiple proposed vehicle locations;
following the sequentially displaying of the simulated vehicle orientation, receiving a user verification of the simulated vehicle orientation for at least one proposed vehicle location on the simulated vehicle path, producing a user-verified simulated vehicle orientation;
producing approved vehicle control commands from the simulated vehicle path and user-verified simulated vehicle orientation; and
applying the approved vehicle control commands to cause the autonomous vehicle to follow the simulated vehicle path and achieve the user-verified simulated vehicle orientation.

33. The method of claim 32, wherein the plurality of proposed vehicle locations comprises at least one proposed hole location.

34. The method of claim 33, wherein the simulated vehicle path does not include passage over a proposed hole location after said proposed hole location is to have been drilled.

* * * * *